(No Model.)
C. W. LAWRENCE.
GRINDING MILL.
No. 270,817. Patented Jan. 16, 1883.
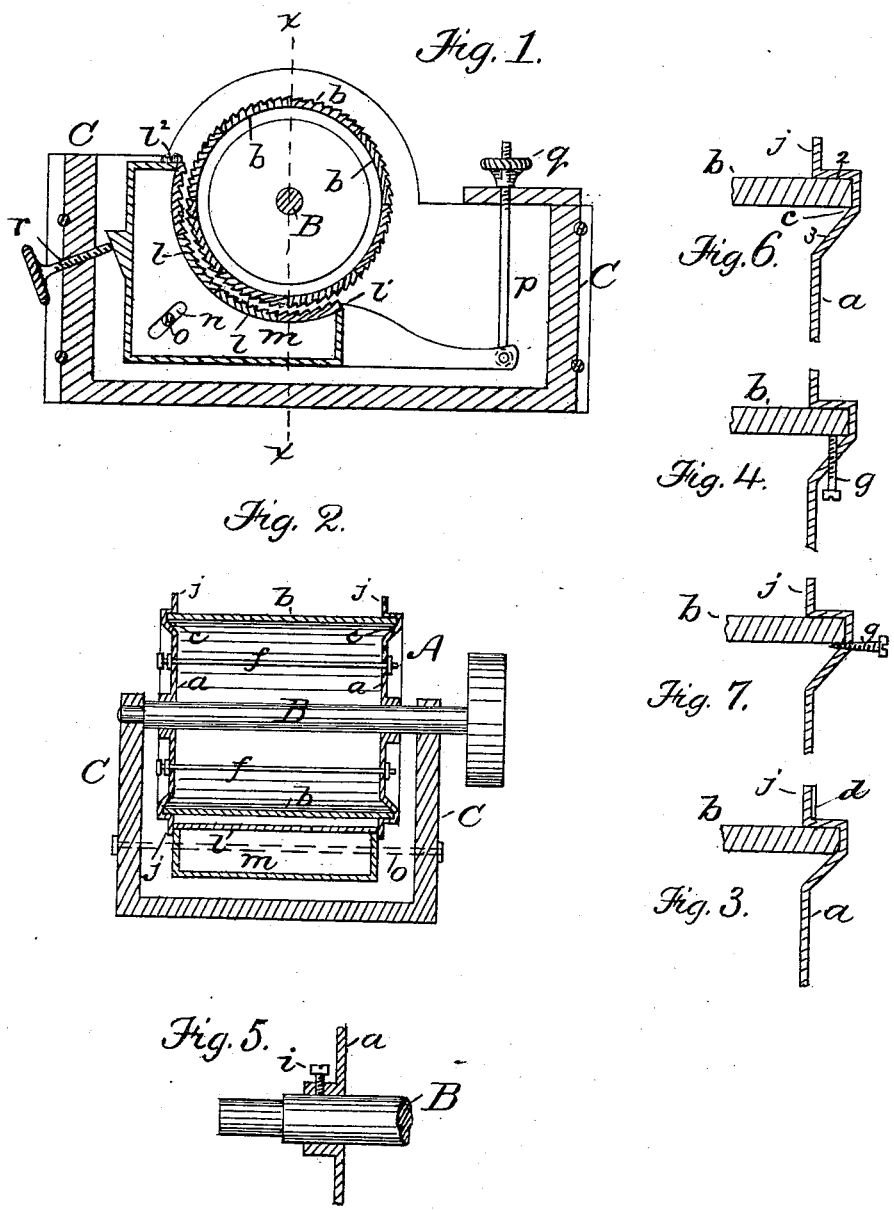
Witnesses.
Geo. W. Pierce
C. F. Brown
Inventor.
Charles W. Lawrence

UNITED STATES PATENT OFFICE.

CHARLES W. LAWRENCE, OF CHELSEA, ASSIGNOR TO THE LAWRENCE WHITE-IRON PORTABLE GRIST MILL COMPANY, OF BOSTON, MASS.

GRINDING-MILL.

SPECIFICATION forming part of Letters Patent No. 270,817, dated January 16, 1883.

Application filed April 17, 1882. (No model.)

*To all whom it may concern:*

Be it known that I, CHARLES W. LAWRENCE, of Chelsea, in the county of Suffolk and State of Massachusetts, have invented certain Improvements in Grinding-Mills, of which the following is a specification.

This invention relates to so-called "peripheral grinding-mills" employing a rotating wheel or cylinder having a grinding-surface and a concave co-operating with said surface.

My invention has for its object to provide certain improvements in the construction of the grinding-wheel and in the manner of supporting the concave; and it consists in the improvements which I will now proceed to describe and claim.

Of the accompanying drawings, forming a part of this specification, Figure 1 represents a longitudinal vertical section of a grinding-mill embodying my improvements. Fig. 2 represents a transverse section on line $x\,x$, Fig. 1. Figs. 3, 4, 5, 6, and 7 represent detail views.

The same letters of reference indicate the same parts in all the figures.

In the drawings, A represents the grinding wheel or cylinder, the arbor B of which is journaled in a suitable supporting-frame, C. The wheel is composed of circular end plates or disks, $a\,a$, placed upon the arbor, one or both of the plates being adjustable thereon to vary the distance between them and segmental grinding plates or sections $b$, the ends of which are inserted in grooves $c$ in the inner sides of the plates $a\,a$. Each groove $c$ has an outer side or shoulder, 2, which is exactly concentric with the center of the arbor B, and an inner side, 3, which is inclined or beveled, as shown in Fig. 2. Before the grinding-plates $b$ are inserted in the grooves $c$ the plates $a\,a$ are separated from each other by moving one or both upon the arbor until a space exists between them sufficient to enable each plate $b$ to be inserted at one end in the groove of one plate and passed at its other end through a shallow recess, $d$, which is formed in the inner side of the other plate, (see Fig. 3.) and into the groove thereof. The recess $d$ is of sufficient width to admit a single plate $b$, and after each plate is passed through the recess it is moved along in the grooves to make room for the next plate $b$, and so on until all the plates are inserted and the periphery of the wheel is completed. The end plates, $a\,a$, are then moved toward each other, thus causing the beveled sides of the grooves to force outwardly the ends of the grinding-plates and hold the same firmly against the outer concentric shoulders, 2, of the grooves, the thickness of the plates $b$ being equal to the width of the bottoms of the grooves. The end plates, $a\,a$, are positively held in the positions to which they are moved in securing the grinding-plates by any suitable means—as, for example, screw-bolts $f\,f$, extending from one plate $a$ to the other, as shown in Fig. 2, or set-screws $i$ in the hubs of the plates $a$, as shown in Fig. 5.

It will be seen that by the described construction entire accuracy of the grinding-surface is produced by the act of moving the end plates toward each other. The shoulders 2 of the end plates are accurately turned out on a lathe so that they are perfectly concentric with the axis of the wheel, and the beveled shoulders 3 by their outward pressure on the grinding-plates insure a close fit of said plates against the concentric shoulders 2. There is no possibility, therefore, of the grinding-plates fitting loosely and rattling in the grooves of the end plates, as they might do if both sides of said grooves were at right angles to the bottom thereof, as heretofore. The beveled sides of the grooves confer another advantage over the right-angled grooves heretofore used, viz: in case any of the grinding-plates should be too thick (and it is impossible to prevent some variation in the thickness of said plates, they being formed by casting) it is only necessary to grind away the ends of the plate at its corners instead of at its sides, as would be necessary if right-angled grooves were employed. Much time and labor are thus saved. In grinding away the sides of the grinding-plates to adapt them to a right-angled groove there is liability of removing too much metal, and thus causing the grinding-plates to fit loosely in the grooves. This difficulty is mainly obviated by the form of my improved grooves.

If desired, the plates $a$ may be provided with screw $g$, as shown in Fig. 4, said screws corresponding in number and position to the grinding-plates $b$, and serving to press the plates $b$ outwardly against the shoulders 2 in case any of said plates are not the requisite thickness. The outer portions of the end plates, $a\ a$, form flanges $j\ j$, projecting beyond the grinding-surface at both ends, as shown in Fig. 2.

The concave which I employ is composed of a series of sections or plates, $l$, supported by a bed or holder, $m$. The plates $l$ are secured to the bed by means of a screw, $l^2$, at one end of the concave and a projection, $l'$, at the opposite end of the concave. The projection $l'$ supports the plate $l$ at one end of the series, and the head of the screw bears against the plate $l$ at the opposite end of the series and clamps said plates together by pressing them in the direction of the projection $l'$. Neither of the plates $l$ is secured independently against endwise displacement; but as said plates extend transversely of the bed or holder, and are of such length that they extend across the space between the flanges $j\ j$ of the grinding-wheel, as shown in Fig. 2, said flanges act as guards to prevent endwise displacement of the plates, as will be readily seen. The manner described of securing the plates $l$ is claimed in another application. The holder of the concave is provided with an inclined slot, $n$, which is substantially radial with the center of the grinding-wheel, and is in a plane which is about equidistant from the ends of the concave. In the slot $n$ is a bolt, $o$, which is rigidly attached to the frame C, and serves as a support for the upper wall or side of the slot $n$, and therefore supports the concave.

$p$ represents a vertical rod, which is pivoted to the holder $m$ at one end, and is suspended from the frame C, as shown in Fig. 1. The rod $p$ is vertically adjustable by means of a nut, $q$.

$r$ represents an adjusting-screw bearing against the opposite end of the holder $m$, and preventing said holder from sliding diagonally downward on the bolt or support $o$. It will be seen that when the screw $r$ is drawn backwardly it will permit the holder $m$ to slide downwardly on the bolt $o$, and thus increase the distance between the concave and the grinding-cylinder, and when said screw is forced inwardly it will raise the holder $m$ and the concave diagonally on the bolt $o$ toward the grinding-cylinder. By this construction the adjustment of the concave relatively to the cylinder is very easily and quickly effected. Each movement of the concave produced by the screw $r$, slot $n$, and pin $o$ is rectilinear, so that all portions of the concave are moved alike toward and from the wheel. The adjustable rod $p$ enables the end of the holder to which it is pivoted to be adjusted vertically, so as to adjust the inclination of the concave.

I claim—

1. In a peripheral grinding-wheel, the combination of the end plates having grooves $c\ c$, each having an outer side or shoulder, 2, concentric with the axis of the wheel, and a beveled inner side, 3, with the grinding plates or sections having their ends inserted in said grooves, and means for adjusting said end plates on the arbor and positively holding them in any position to which they may be adjusted, whereby when the end plates are moved toward each other the beveled surfaces of the grooves are caused to exert an outward pressure on the grinding-plates, and hold the latter firmly against the outer shoulders, 2, of the grooves, as set forth.

2. The end plates having concentric grooves $c\ c$, each having an outer side or shoulder substantially at right angles to the plate, combined with the grinding plates or sections having their ends inserted in said grooves, and screws $g\ g$, adapted to press the grinding-plates against the outer shoulders of the grooves, as set forth.

3. The concave having the grinding-plates $l\ l$, held in place laterally by clamping devices, substantially as described, combined with the grinding wheel having end flanges, $j\ j$, whereby the grinding plates of the concave are prevented from endwise displacement, as set forth.

4. In a grinding-mill, the combination, with the cylinder, of the concave having an inclined slot or bearing, means for adjustably supporting said concave at its forward end, a fixed bolt or support in said slot, and means for horizontally adjusting said concave, said means co-operating with the inclined bearing and its support in giving the concave a diagonal movement toward and from the cylinder, as set forth.

5. In a grinding mill, the combination of a frame or support, C, the grinding-wheel journaled thereon, the concave having the inclined slot, the vertically-adjustable rod or hanger pivoted to the concave, the fixed rod or support in the inclined slot of the concave, and the adjusting-screw $r$, bearing against one end of the concave, as set forth.

In testimony whereof I have signed my name to this specification, in the presence of two subscribing witnesses, this 14th day of April, 1882.

CHARLES W. LAWRENCE.

Witnesses:
C. F. BROWN,
GEO. W. PIERCE.